US009354860B2

(12) United States Patent
Eberlein et al.

(10) Patent No.: US 9,354,860 B2
(45) Date of Patent: May 31, 2016

(54) OPTIMIZING SOFTWARE CHANGE PROCESSES USING REAL-TIME ANALYSIS AND RULE-BASED HINTING

(71) Applicants: Peter Eberlein, Malsch (DE); Volker Driesen, Walldorf (DE)

(72) Inventors: Peter Eberlein, Malsch (DE); Volker Driesen, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/331,794

(22) Filed: Jul. 15, 2014

(65) Prior Publication Data

US 2016/0019042 A1   Jan. 21, 2016

(51) Int. Cl.
*G06F 9/44* (2006.01)
*G06F 9/445* (2006.01)
*G06N 5/04* (2006.01)

(52) U.S. Cl.
CPC .. *G06F 8/65* (2013.01); *G06F 8/70* (2013.01); *G06N 5/047* (2013.01)

(58) Field of Classification Search
None
See application file for complete search history.

(56) References Cited

U.S. PATENT DOCUMENTS

| | | | |
|---|---|---|---|
| 6,257,774 B1 | 7/2001 | Stack | |
| 6,826,579 B1 | 11/2004 | Leymann et al. | |
| 7,404,175 B2 | 7/2008 | Lee et al. | |
| 7,523,142 B2 | 4/2009 | Driesen et al. | |
| 7,657,575 B2 | 2/2010 | Eberlein et al. | |
| 7,702,650 B2 | 4/2010 | Brunswig et al. | |
| 7,720,992 B2 | 5/2010 | Brendle et al. | |
| 7,725,907 B2 | 5/2010 | Bloching et al. | |
| 7,730,412 B2 | 6/2010 | Said | |
| 7,734,648 B2 | 6/2010 | Eberlein | |
| 7,739,387 B2 | 6/2010 | Eberlein et al. | |
| 7,752,253 B2 | 7/2010 | Manion et al. | |
| 7,877,695 B2 | 1/2011 | Brunswig et al. | |
| 7,900,190 B2 | 3/2011 | Brunswig et al. | |
| 7,971,209 B2 | 6/2011 | Eberlein et al. | |
| 2003/0046675 A1* | 3/2003 | Cheng et al. .................. 717/173 |
| 2003/0229890 A1* | 12/2003 | Lau et al. ...................... 717/168 |
| 2007/0150871 A1* | 6/2007 | Barsness et al. .............. 717/128 |
| 2007/0233728 A1 | 10/2007 | Puteick et al. | |
| 2007/0239800 A1 | 10/2007 | Eberlein | |
| 2008/0005623 A1 | 1/2008 | Said | |
| 2008/0082575 A1 | 4/2008 | Peter et al. | |
| 2008/0288960 A1 | 11/2008 | Eberlein et al. | |
| 2009/0089755 A1* | 4/2009 | Johnson .............. G06F 11/3688 717/124 |
| 2009/0144721 A1 | 6/2009 | Wagner et al. | |
| 2010/0153341 A1 | 6/2010 | Driesen | |
| 2010/0228788 A1 | 9/2010 | Eberlein | |
| 2010/0332585 A1 | 12/2010 | Driesen | |
| 2011/0145571 A1 | 6/2011 | Schmidt-Karaca et al. | |

(Continued)

*Primary Examiner* — Isaac T Tecklu
(74) *Attorney, Agent, or Firm* — Fish & Richardson P.C.

(57) ABSTRACT

In one aspect, the present disclosure relates to a method which comprises obtaining a set of software change process parameters characterizing the particular process, based on the obtained set of software change process parameters, selecting hot spot information corresponding to the obtained set of software change process parameters, the hot spot information being based on a statistical analysis of previous software change processes and wherein the hot spot information identifies one or more steps of the multiple steps of the process during which problems have occurred in the previous processes, providing the hot spot information to the host computer system for use in the software change process and obtaining status information relating to the software change process at multiple times during the execution of the software change process, a level of detail of the status information being increased for steps of the process identified in the hot spot information.

20 Claims, 4 Drawing Sheets

(56) References Cited

U.S. PATENT DOCUMENTS

| | | | |
|---|---|---|---|
| 2013/0036402 A1* | 2/2013 | Mutisya et al. | 717/124 |
| 2013/0103990 A1* | 4/2013 | Hopper | 714/49 |
| 2013/0125107 A1* | 5/2013 | Bandakka et al. | 717/171 |
| 2014/0053135 A1* | 2/2014 | Bird | G06F 8/71 717/124 |
| 2014/0123099 A1* | 5/2014 | Amulu | 717/100 |
| 2014/0130036 A1* | 5/2014 | Gurikar et al. | 717/176 |
| 2014/0143768 A1* | 5/2014 | Kazalski et al. | 717/171 |

* cited by examiner

OPTIMIZING SOFTWARE CHANGE PROCESSES USING REAL-TIME ANALYSIS AND RULE-BASED HINTING

TECHNICAL FIELD

The present disclosure relates to methods and systems for computer systems. In particular, the present disclosure relates to a method for software change processes.

BACKGROUND

In some state-of-the-art computer systems (e.g., a database system), software has to be continuously or periodically changed (e.g., upgraded, patched or configured). Such software change processes can include system downtime, multiple steps, and/or have a considerable complexity. Errors and delays in software change processes can lead to substantial additional system downtime.

SUMMARY

In a first general aspect of the present disclosure a computer implemented method comprises obtaining, from a host computer system on which a software change process is to be executed, a set of software change process parameters characterizing the particular software change process, the software change process including multiple steps to be carried out to effect the software change, based on the obtained set of software change process parameters, selecting hot spot information corresponding to the obtained set of software change process parameters, the hot spot information being based on a statistical analysis of previous software change processes and wherein the hot spot information identifies one or more steps of the multiple steps of the software change process during which problems have occurred in the previous software change processes, providing the hot spot information to the host computer system for use in the software change process and obtaining, from the host computer system, status information relating to the software change process at multiple times during the execution of the software change process, a level of detail of the status information being increased for steps of the software change process identified in the hot spot information.

In a second aspect according to the first aspect, the steps are executed on a computer system of a vendor of software the software change process acts upon.

In a third aspect according to the second aspect, the operations of obtaining a set of software change process parameters, selecting the hot spot information, providing the hot spot information to the host computer system and obtaining the status information are executed on the computer system of a vendor of software automatically.

In a fourth aspect according to any one of the preceding aspects, the set of software change process parameters includes one or more of an identifier of a software change process tool which is employed in the software change process, versioning information of a software change process tool which is employed in the software change process, system parameters of the computer system the software change process acts upon, information regarding the steps of the software change process is to be executed and information regarding the content to be deployed on the computer system the software change process acts upon.

In a fifth aspect according to any one of the preceding aspects, the status information comprises information regarding one or more of a duration of the execution of a particular step of the software change process, a success or failure of the execution of a particular step of the software change process, a duration of the execution of the entire software change process and a success or failure of the execution of a entire step of the software change process.

In a sixth aspect according to the fifth aspect, the method further comprises analyzing obtained sets of software change process parameters and obtained status information of one or more software change processes, identifying critical software change processes or critical steps of particular software change processes based on the analyzing operation and indicating the identified critical software change processes or critical steps of particular software change processes in the hot spot information.

In a seventh aspect according to the sixth aspect, the operations of analyzing obtained sets of software change process parameters and obtained status information, identifying critical software change processes or critical steps of particular software change processes and indicating the identified critical software change processes or critical steps of particular software change processes are executed automatically.

In an eighth aspect according to the sixth or seventh aspect, identifying critical software change processes or critical steps of particular software change processes includes one or more of determining a deviation from an average duration and/or success rate for a particular software change process having a particular set of software change process parameters or of a step of a particular software change process having a particular set of software change process parameters from other software change processes or steps of software change processes.

In a ninth aspect according to any one of the preceding aspects, the method further comprises obtaining, from the host computer system during execution of the software change process, status information indicating that an error occurred during execution of a particular step of the software change process, automatically identifying a possible solution from a set of solutions based on the obtained status information, the set of software change process parameters of the software change process, or both and automatically providing the identified possible solution to the host computer system.

In an eleventh aspect according to the tenth aspect, each solution is associated with a set of software change process parameters, obtained status information, or both, of one or more previous software change processes or steps of previous software change process where the solution was successfully applied and the possible solution is automatically selected from a set of solutions based on a similarity of the status information, the set of software change process parameters of the software change process, or both of the and status information, set of software change process parameters, or both of previous software change processes associated with the solution.

In a twelfth aspect according to the tenth or eleventh aspect, automatically selecting the solution comprises determining if a solution exists having identical status information, an identical set of software change process parameters of the software change process, or both, and if no such solution exists, determining if a solution exists having similar status information, a similar set of software change process parameters of the software change process, or both.

In a thirteenth aspect according to any one of the tenth to twelfth aspects each solution has a rating, the method further comprising automatically selecting a solution with a highest rating If multiple solutions are identified for a particular error.

In a fourteenth aspect according to any one of the preceding aspects, an increased level of detail of status information includes one or more of an increased frequency with which status information is sent, an increased amount of data which is provided as status information and additional information regarding the software change process, the host computer system on which a software change process is executed, information regarding the actions of a technician carrying out the software change process and a trace of the operations executed at the host computer system.

In a fifteenth aspect according to any one of the preceding aspects, the operations are executed in an in-memory database environment.

In a sixteenth aspect according to any one of the preceding aspects, the method further comprises automatically collecting, from the host computer system, information regarding activities in connection with a problem solution of an error which has occurred during the software change process and including a new solution in a store of possible solution based on the collected information.

In a seventeenth aspect according to any one of the preceding aspects, the software change process is executed during run time of the software to be changed, the method further comprising obtaining, from the host computer system, information regarding an impact of the software change process on the run time performance of the software to be changed and adapting a software change process based on the information regarding an impact of the software change process on the run time performance of the software.

In an eighteenth aspect according to any one of the tenth to seventeenth aspects, automatically selecting the solution comprises determining if a solution exists having identical status information, an identical set of software change In a nineteenth aspect according to any one of the preceding aspects, the status information is pushed from the host computer system on which a software change process is to be executed.

In a twentieth aspect according to any one of the preceding aspects, a level of detail of the status information is increased for all steps of the software change process identified in the hot spot information.

In a twenty-first aspect according to any one of the preceding aspects the method further includes automatically analyzing status information associated with multiple software change processes, determining whether for a particular step of a particular software change process a problem frequency is above a predetermined threshold and identifying the particular step as hot spot if the problem frequency is above the predetermined threshold.

In a further general aspect of the present disclosure a computer implemented method includes providing a set of software change process parameters characterizing the particular software change process to be executed on a host computer to a remote computer system, wherein the software change process includes multiple steps to be carried out to complete the software change, obtaining, from the remote computer system, hot spot information corresponding to the provided set of software change process parameters, wherein the hot spot information is based on a statistical analysis of previous software change processes and wherein the hot spot information identifies one or more steps of the multiple steps of the software change process during which issues have occurred in the previous software change processes and providing status information relating to the execution of the software change process to the remote computer system at multiple times during the execution of the software change process, wherein a level of detail of the status information is increased for steps of the software change process identified in the hot spot information than for other steps of the software change process.

In a further general aspect of the present disclosure a computer readable medium storing instructions thereon which when executed by a processor cause the processor to perform operations of any one of the methods according to the first to twenty-first aspects.

In a further general aspect of the present disclosure a computer system includes one or more processors and a computer-readable medium storing instructions executable by the one or more processors to perform operations of any one of the methods according to the first to twenty-first aspects.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

The present disclosure relates to methods and systems for computer systems. In particular, the present disclosure relates to a method for software change processes.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

The subject-matter described in this disclosure can be implemented in particular embodiments so as to realize one or more of the following advantages:

First, a software change process can be accelerated as different aspects of error handling of errors occurring in a software change process can be executed (at least partially) in an automated manner. In some systems, this can reduce the frequency of involvement of support personnel to solve occurring errors which can, in turn, shorten the waiting time until support personnel attends to a particular issue.

Second, a length and frequency of down times of a computer system due to errors in software change processes can be decreased.

Third, a head count of a group of support personnel for a particular piece of software can be reduced. In some particular systems, it can be possible to process 90% of the issues occurring during software change processes in an automated fashion.

Fourth, bandwidth and memory requirements for a system monitoring a software change process can be reduced by flexibly increasing a level of detail of status information provided from a host computer system around hot spots of the software change process.

Fifth, reported status information can be automatically analyzed to select new solutions to existing problems, to find and to rank working solutions and to detect and discard non-working solutions. In this manner, a fast (in some situations even real-time) automated population of a solution store can be achieved.

As used in the present disclosure, a "software change process" includes any process for deployment of software, upgrading or patching of software, administrating or maintaining of software or configuring a particular computer system running a software. A software change process includes two or more steps which have to be executed to effect the software change. In some examples, the steps have to be executed in a serial manner. In other examples, some or all of the steps can be executed in parallel to other steps of the software change process.

As used in the present disclosure, a "computer system" includes any environment capable of hosting the functional units described in the present disclosure. A "computer system" is not restricted to any particular hardware configurations. For instance, a "computer system" can be a single personal computer or laptop or a complex distributed network of multiple computer devices hoisting a database system.

As used in the present disclosure, a "hot spot" is one or more of the multiple steps of the software change process during which problems have occurred in the previous software change processes, or during which problems are likely to occur in view of the particular nature of the steps (e.g., a software change process steps requires particular interactions of a user carrying out the software change process).

The systems and methods described herein will be explained subsequently in more detail in connection with the example system of FIG. 1 and FIG. 2. An example of a status information transmitting process will be detailed in connection with FIG. 3. Different aspects of the methods for optimizing a software change process will be discussed in connection with FIG. 4. The term "optimizing" as used herein does not mean that the solutions described herein necessarily provide, in view of any criterion, an optimal solution. The term "optimizing" is merely selected to illustrate that the systems and methods described herein can, compared to systems and methods not employing the techniques described herein, result in one or more of the advantages discussed above, or other advantages.

In the subsequent sections, a system for optimizing a software change process will be discussed in connection with FIG. 1. In the example of FIG. 1, a host computer system 102 interacts with a software vendor computer system 101 during a software change process. However, the systems and methods described herein are not limited to this particular situation. For instance, all functional units can be hosted on the same computer system. Furthermore, the functional units being hosted at the software vendor computer system 101 can also be hosted on other computer systems. For instance, these functional units can be hosted on a computer system of a third party (e.g., a vendor offering maintenance services).

The functional units on the host computer system side (e.g., a customer of the software vendor having installed a particular database system) will be described first. In the example of FIG. 1, the host computer system includes a host agent 107 and a software change process tool 108. The host agent 107 is adapted to connect with the software vendor computer system 101 to provide an interface for the data exchange described herein. In addition, the host agent 107 is configured to exchange data with the software change process tool 108. This software change process tool 108 is adapted to carry out one or more particular software change processes. In order to do so, an instance of the software change process tool is generated at the host computer system 102. The software change process can be performed by a user or can be executed automatically, or a combination of both (e.g., a user has to initiate particular steps). For instance, a technician can coordinate the software change process from a particular terminal being connected to a host computer system (e.g., a database system). The software change process tool 108 can provide a graphical user interface (not shown in FIG. 1) to allow the user to interact with the software change process tool 108 and control the operations of the software change process tool 108.

As described above, there is a great variety of different possible software change processes. There can be dedicated software change process tool 108 for a particular type of software change process (e.g., a system configuration software change process or an update software change process for a particular module). In other examples, a general purpose software change process tool 108 can be adapted to execute multiple software change processes (e.g., all upgrades for a complex database system or a particular module of a database system). Different instances of one software change process tool 108 can be executed on the host computer system 102 concurrently or at different times.

After having described the host computer system side units, the functional units on the software vendor computer system 101 will be discussed in the subsequent sections. In some implementations, the software vendor computer system 101 of FIG. 1 includes a software change process execution instance store 103, a hot spot store 104, a solution store 105, a hot spot analysis engine 109, a hot spot solution mapping engine 110, a solution rating engine 111, and a solution editor 106. As will be explained in more detail below, not all these units are required to implement the methods and systems described in the present disclosure. Moreover, the functional units in FIG. 1 are not necessarily separated (e.g., as separate software or hardware components) on the software vendor computer system 101. In some implementations, the functional units can be hosted in different environments. In one example, the functional units are stored in an in-memory database. In addition or alternatively, the functional units can be stored in a cloud storage environment or on a backend server system.

The different functional units will be discussed in the following sections starting with the different stores. The software change process execution instance store 103 collects different data relating to software change processes being executed or having been executed on one or more host computer systems 101. Although in FIG. 1 only a single host computer system 101 is depicted, a particular software product can be installed on many different host computer systems. The software change process execution instance store 103 can collect data relating to software change processes multiple or all of these host computer systems. The data collected by the software change process execution instance store 103 includes a set of software change process parameters characterizing the particular (instance of a) software change process. In addition, the software change process execution instance store 103 can collect status information relating to a particular (instance of a) software change process. In one example, software change process parameters can be parameters which are determined upon instantiation of a software process change tool whereas status information is determined throughout the execution of a particular instance of the software process change tool or after completion of the execution of a particular instance of the software process change tool. However, there is no clear distinction between software change process parameters and status information. The same datum can be one or both of a software change process parameter and status information.

For example, the software change process parameters can include one or more of an identifier of a software change process tool which is employed in the software change process (e.g., a name of the software change process tool), versioning information of a software change process tool which is employed in the software change process (e.g., a version number of the software change process tool), tool parameters a particular software process change tool instance, system parameters of the computer system the software change process acts upon (e.g., which operation system is employed, which hardware components are included in the computer system, which other software is installed on the computer system), information regarding the steps of the software change process is to be executed and information regarding the content to be deployed on the computer system the software change process acts upon.

In one illustrative example, a selected software change process tool can be the "Software Update Manager," version 7.20, support package level 12. The application can be "SAP ERP" Version 7.16. The system in the customer landscape can run SAP ERP Version 7.16 support package 2 and shall be upgraded to support package 4. The selected software change tool thus shall deploy thus the support packages 3 and 4 of SAP ERP. In the current example, the system can have deployed languages "English, German, French, Japanese". These languages have thus to be updated for support package 3 and 4 as well. The database type can be SAP HANA support package 7. The SAP HANA database software is upgraded to version support package 8. In this example, the host can run the operating system Linux, Sles 11. The SAP Kernel software is required for Linux. The SAP Kernel is updated from version 7.20 patch level 10 (Linux make) to patch level 21 (Linux make). The tool is configured to run in "downtime minimized mode" to use ten parallel processes in "system downtime" and five parallel processes in "system uptime".

Status information can include information regarding one or more of a duration of the execution of a particular step of the software change process, a success or failure of the execution of a particular step of the software change process, a duration of the execution of the entire software change process and a success or failure of the execution of a entire step of the software change process. For example, status information can include a total run time. In other examples, the status information includes error identifiers (e.g., an error number) of errors that occurred when executing a particular step of a software change process. As will be described subsequently, a level of detail of the status information can be increased for steps of software change processes or complete software change processes which have been identified as hot spots.

The hot spot store 104 will be discussed next. The hot spot store 104 includes information identifying steps of the software change process or entire software change processes during which problems have occurred in the previous software change processes, or during which problems are likely to occur in view of the particular nature of the steps. For instance, a particular software change process can include twenty steps and the execution of the third step proved to be particularly error prone in the past. In this example, the hot spot store includes information identifying this third step as a hot spot of the particular software change process. The hot spot store 104 can include hot spot information on different levels of granularity. For instance, the hot spot store 104 can include hotspot information for particular software change process tools. In addition or alternatively, the hot spot store 104 can include hot spot information for particular versions of software change process tools. In addition to or alternatively, the hot spot store 104 can include hot spot information regarding particular steps of a software change process tool. In addition to or alternatively, the hot spot store 104 can include hot spot information regarding any software change process parameter discussed above (e.g., computer system type or content to be deployed on the computer system). The hot spot store 104 can also include hot spot information regarding any combination of the parameters discussed above. In addition, the same level of granularity does not have to be implemented in the hot spot store 104 for all software change processes for a particular software product.

In one example a hot spot can be an upgrade of ABAP products (e.g., SAP ERP, SAP CRM and others), where the system is running SAP MaxDB. In this example, the software process change tool could be "SUM 7.40, SP12" and a relevant step can be the step named "Main Import". The problem can be that the step runs into performance issues and the step takes un-proportionally longer on MaxDB than on other databases.

The following example further illustrates what hot spot information can encompass. For example, it has been recognized that an upgrade of a particular software module from version 1.8 to version 1.9 has a particularly cumbersome step (step 16), but only on Linux systems. In this example, the hot spot information could identify step 16 of the upgrade process from version 1.8 to version 1.9 of the software module on Linux systems as hot spot. However, in a less finely grained hot spot store the spot information can also merely identify the upgrade process from version 1.8 to version 1.9 of the particular software module as a hot spot (regardless of the system), or the hot spot information can also identify step 16 as a hot spot (regardless of the system and the version).

Furthermore, the hot spot store 104 can include statistical information regarding software change processes. Again, the statistical information can be stored in different levels of detail, as described above in connection with the hot spot information (e.g., per software process change tool, per software process change tool version for a certain database type and many more). The statistical information can include one or more of an average (e.g., an arithmetic mean, a weighted average, a median or any other suitable average) fail or success rates, average execution times, deviations of average fail or success rates (e.g., a first order deviation, a standard deviation or any other suitable measure) and/or deviations of execution times. The definition of a success and a failure might be user defined or pre-defined. In addition, different other measures can be used to quantify success and failure, or difficulties caused by a particular software change process or step of a software change process. For example, a score can be calculated reflecting the difficulties caused by a particular software change process or step of a software change process. For instance, a number of errors and a duration of the execution of the particular software change process or software change process can be reflected by a score. The hot spot store 104 can store this information for a particular time span, or permanently. Additional details will be discussed below in connection with the hot spot analysis engine 109.

For instance, the above discussed upgrade of a particular software module from version 1.8 to version 1.9 on Linux systems can have a fail rate of 0.3 (e.g., three out of ten software change processes results in an error). Moreover, for example, a cumbersome step 16 of this process can have a fail rate of 0.25 (e.g., almost all errors in this example software change process can be attributed to errors in step 16). In addition, an average fail rate of step 16 for all other operational systems can be 0.05.

Lastly, the solution store 105 will be discussed in more detail. The solution store 105 contains error resolution plans for dealing with different errors occurring during execution of the software change processes. In one example, each particular solution is attributed with a set of solution attributes. These can be identical or corresponding to the software change process parameters and status information data discussed above (e.g., identifier of a software change process tool, version of identifier of a software change process tool, identifier of a step of a software change process, system type and so on). In addition, the solution attributes can map a range of software change process parameters to a particular solution (e.g., an error in step 8 of versions 1.5 to 1.8 of a particular software change process tool can be mapped to the same solution). Moreover, in some examples, each solution can have an error identifier attribute.

Apart from its attributes, each solution in the solution store 105 includes a description of the proposed steps to be carried out to solve the problem. This description can be a human readable description (e.g., if a user is to carry out the software change process). In other examples, the description can include an executable program which can be executed on the host computer system to automatically or semi-automatically deal with an error. In other examples, the correction can be a software artifact, which is deployed to the system or the software logistics tool to remove the problem. In addition, each solution can include success and failure statistics for the particular solution and a rating.

In the previous sections the content of the different stores of the software vendor computer system 101 has been discussed. Subsequently, it will be explained how the different engines of the software vendor computer system 101 operate on the data in these stores.

The hot spot analysis engine 109 will be described first. As illustrated in FIG. 1, the hot spot analysis engine 109 collects data from the software change process execution instance store 103. After having processed this data, the hot spot analysis engine 109 populates the hot spot store 104 with hot spot information and statistical data relating to the software change processes (e.g., the hot spot information and statistical data discussed above). In one example, the hot spot engine 109 can calculate average success and failure rates and execution durations and respective deviations of the average values. This can again include different levels of granularity (e.g., all software change process tools, particular software change process tools, particular versions of software change process tools, particular steps of software change process tools, particular system types, particular deployment content and version, and so on). For instance, the hot spot engine 109 can calculate that an average failure rate for all software change process tools acting on Linux systems is 0.1 and a standard deviation is 0.06. As already discussed above, the hot spot engine 109 can also determine other measures for quantifying success and failure. For instance, a score can be calculated to quantify the difficulty of a particular software change process or of a particular step of a software change process (or, for example, any of the other levels of granularity described above).

In addition, the hot spot analysis engine 109 is configured to identify hot spots based on the determined calculated statistical information. During this process, the hot spot analysis engine 109 can check whether a particular software change process or a particular step of a software change process has a failure rate (or any other measure quantifying success or failure) exceeding a particular threshold. If this is the case, the hot spot analysis engine 109 can identify a particular software change process or a particular step of a software change process as a hot spot. The threshold can be an absolute threshold or a relative threshold compared to an average failure rate (or any other measure quantifying success or failure) for a particular selection of software process change instances. For instance, the hot spot analysis engine 109 can check whether a failure rate is a particular number standard deviations higher than the average (e.g., one standard deviation, 1.5 standard deviations or two standard deviations higher).

The hot spot analysis engine 109 can also select the software process change instances to compare with the particular software change process or step of a software change process according to different user selectable rules. For instance, a particular step's failure rate (or any other suitable measure) can be compared to the failure rates of the remaining steps of the software change process to which the particular step belongs. In other examples, a particular step can occur in an identical or similar manner in different software change processes, so a failure rate can be compared to failure rates of the same or similar step in other software change processes. In addition or alternatively, a failure rate of a particular software change process can be compared to a failure rate of the software change process instances having a particular range of software change process parameters (e.g., a failure rate of step 10 in version 2.0 is compared to failure rates of step 10 in versions 1.8 through 2.5). In addition to or alternatively, a failure rate of a particular software change process having a particular set of software change process parameters can be compared to a failure rate of a set of software change process instances having only some of these software change process parameters. In other words, some software change process parameters are ignored when selecting the set for comparison (e.g., an operating system type parameter can be ignored). In one case, a failure rate of a particular software change process instance is compared to a failure rate for all software change processes (or all software change processes of a particular software change process tool).

In other examples, the hot spot analysis engine 109 can employ pattern matching techniques or other statistical tools to find hot spots. In other examples, the hot spot analysis engine 109 can include a neural network based engine or an engine applying fuzzy logic to find hot spots.

A large number of different techniques to determine hot spots in software change processes (or steps of software change processes) can be implemented based on statistical data of previous executions of other software change processes.

In one example, the hot spot analysis engine 109 can execute the above-described operations automatically (i.e., without intervention of a human operator). In addition to or alternatively, the hot spot analysis engine 109 can update the statistical data and the hot spot information as soon as new data is collected by the software change process execution instance store 103. In addition to or alternatively, the hot spot analysis engine 109 can update the statistical data and the hot spot information regularly (e.g., once every ten minutes or once every hour), or in response to a particular trigger event (e.g., a particular amount of data collected by the software change process execution instance store 103). In one example, the hot spot analysis engine 109 can update the statistical data and the hot spot information substantially in real time. In this manner, a large amount of status information can be processed fairly rapidly to provide current hot spot information.

The hot spot solution mapping engine 110 will now be discussed in the subsequent sections. The hot spot solution mapping engine 110 retrieves data from the hot spot store 104 and the solution store 105, processes this data and provides processed data to the solution store 105. In general, the hot spot solution mapping engine 110 searches and selects suitable solutions for a particular hot spot in the solution store (e.g., a hot spot newly identified by the hot spot analysis engine).

In one example, the hot spot solution mapping engine 110 selects solutions for a particular hot spot based on a comparison of solution attributes of the solutions and a particular set of software change process parameters for the software change process or software change process step including the hot spot. The hot spot solution mapping engine 110 can select a suitable solution if the solution attributes are similar or identical to the set of software change process parameters, or if a particular subset of the attributes is identical to a subset of the set of software change process parameters. In one example, the hot spot solution mapping engine 110 executes an iterative process: In a first possible operation, the hot spot solution mapping engine 110 can search for solutions having a maximum number of solution attributes corresponding to the set of software change process parameters of the software change process including the hot spot (in one example, the solution's attributes correspond to all software change process parameters of the software change process including the hot spot). If one or more suitable solutions are found, the solution is stored as a suitable solution for the particular hot spot in the solution store 105. If no suitable solution can be found, the hot spot solution mapping engine 110 can reduce the maximum number of solution attributes or generalize one or more of the software change process parameters (e.g., after having searched for solutions with operating system parameter "Linux," the hot spot solution mapping engine 110 also searches for solutions for other operating systems). These operations can be repeated one or more times (i.e., with an ever smaller set of software process change parameters or set of solution attributes of increasing generality). In some examples, the hot spot solution mapping engine 110 can stop this iterative process at a predetermined point (e.g., it might be unlikely that very general solutions, e.g., "restart the process," are helpful). In this situation, a support technician can define a new solution and add it to the solution store 105, as described above.

Similar to what was described above in connection with the hot spot analysis engine 109, the hot spot solution mapping engine 110 can execute its operations automatically. In addition to or alternatively, the hot spot solution mapping engine 110 can search for suitable solutions as soon as a new hot spot is identified by the hot spot analysis engine 109. In addition to or alternatively, the hot spot solution mapping engine 110 can search for suitable solutions for all or newly identified hot spots regularly (e.g., once every hour or once every day) or in response to a particular trigger event. In one example, the hot spot solution mapping engine 110 can search for suitable solutions substantially in real time. In this manner, new and potentially useful solutions can be provided to users performing a software change process quickly.

Lastly, the solution rating engine 111 will be described. The solution rating engine 111 can implement techniques to monitor and rate the success of solutions in the solution store 105. For instance, the solution rating engine 111 can count how often a particular solution is requested and how often a particular error re-occurred in a later run. In addition, the solution rating engine 111 can request information regarding the error resolution process (e.g., if the error was solved by employing the proposed solution) from the user at the host computer. In addition or alternatively, the solution rating engine 111 can also deduce the success of a particular solution from the further execution of a software change process instance. If, e.g., a software change process tool continues to run after the last solution provided, the solution rating engine 111 can deduce that the solution has worked.

Moreover, the solution rating engine 111 can have one or more of the following features. If a significant number of negative feedbacks are received for a particular solution, the solution rating engine 111 can flag this solution. In addition, the solution rating engine 111 can implement the following process to find new solution. In a first step, a solution can be provided to a user at a host computer system. The solution can be selected based on techniques similar to the techniques described above in connection with the hot spot solution mapping engine 110. In a further operation, if the first solution does not work, a further solution can be proposed. If the solution has worked, it can be proposed to other users. If a solution does not work a threshold number of times, it can again be flagged. The processes of the solution rating engine 111 can also be executed (at least partially) in an automated manner.

In one optional example, the solution rating engine 111 can determine trends of duration of the execution of particular steps of a software change process. In some examples, the duration of the execution of particular steps of a software change process can depend on different parameters as system hardware performance, data size, database type and network performance. This data can be collected in the solution store 105 with a reported completion of a software change process or step of a software change process. Based on this data, the solution rating engine 111 can derive trends. For a certain set of parameters, e.g., hardware performance and database size, typical durations can be calculated. Then, an actual run of a certain customer can be compared with the averages, scaled by the data base size and hardware performance. If a current run deviates significantly from average runtime, there may be a problem and customer admin and vendor support can be notified.

Besides the engines described in the previous sections, the software vendor compute system can include a solution editor 106. Using this unit, technicians can define new solutions and store them in the solution store 105.

In order to operate and monitor the engines and stores of the system for optimizing software change processes described above, the system can provide several user optional interfaces (e.g., graphical user interfaces). For instance, the system can include a solution editor user interface to describe new solutions and define the solution attributes. The solution editor user interface can also visualize the success rate of a solution and also solutions which receive significant negative feedback. In addition, the system can include a hot spot visualizer user interface configured to visualize statistics of the hot spot analysis. In this manner, technicians can find out which software change process tools and constellations have a significant support demand and which thus may require additional solutions (or development of existing solutions). In addition or alternatively, a hot spot solution mapping visualization user interface can provide information regarding problems which occurred and for which no suitable solution could be found.

In the preceding sections, the functional units of the system for optimizing a software change process have been discussed. Subsequently, a process for optimizing a software change process will be discussed in connection with FIG. 2. As can be seen in FIG. 2, the underlying system is the same as in FIG. 1.

Figure 2:
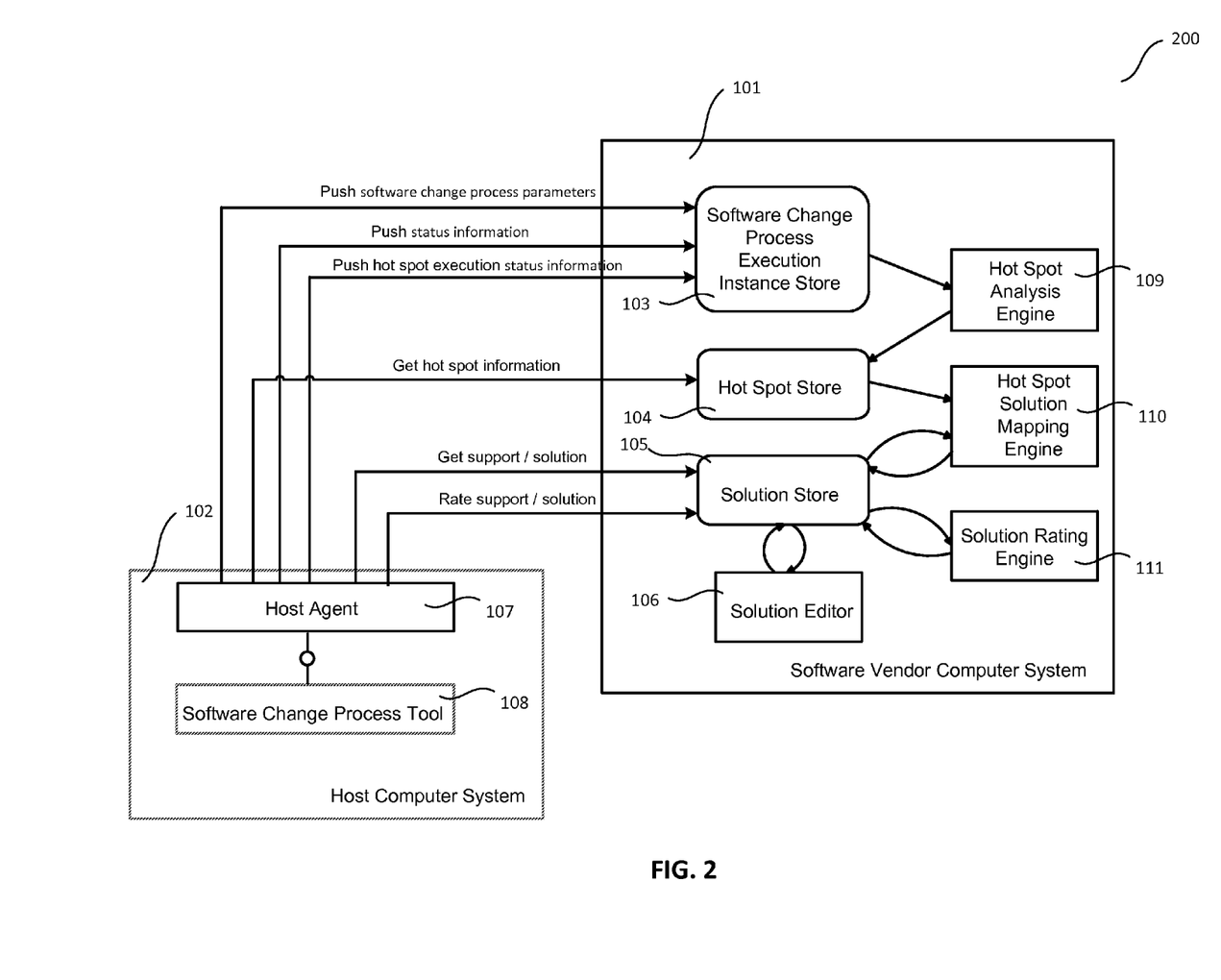
FIG. 2 illustrates different operations in the system of FIG. 1 according to an implementation.

The operations illustrated in FIG. 2 relate to a particular run of a software change process tool. In one operation, a particular software change process tool is instantiated by a user at the host computer system 102. In one example, in a further operation, the host computer system 102 pushes the software change process parameters of the instance of the particular software change process tool to the software change process execution instance store 103. The software change process parameters can include any of the software change process parameters described above. Alternatively or in addition, the software vendor computer system 101 can poll software change process parameters from the host computer system 102 (e.g., the software vendor computer system 101 can poll the software change process parameters periodically or upon a predetermined trigger). In a further operation, the software vendor computer system 101 can select hot spot information corresponding to the obtained set of software change process parameters and provide it to the host computer system 102.

During execution of the software change process, the host computer system can push status information to the software change process execution instance store 103 (different examples of status information have been described above). Again, the software vendor computer system 101 can also poll the status information from the host computer system 102.

Based on the received hot spot information, the host computer system 102 increases a level of detail of the status information for steps of the software change process identified in the hot spot information. In some examples, an entire software change process instance is identified as a hot spot. In these cases, the host computer system 102 can push status information with an increased level of detail for the entire software change process. Details regarding an increased level of detail of the status information of hot spots will be discussed in connection with FIG. 3.

If no error occurs during execution of a particular instance of the software change process tool, a process ends after the final step of the software change process has been successfully completed. If an error occurs, the host computer system 102 can request a solution for this error from the software vendor computer system 101. As described above, the solution store 105 can be continuously populated with solutions for problems occurring during software change processes. Therefore, a suitable solution for the error in a current software change process (e.g., with a particular set of software change process parameters) possibly has been stored in the solution store. By using the techniques described above, the software vendor computer system 101 can automatically retrieve a suitable solution for the error which has occurred during execution of the particular instance of the software change process tool and provide it to the host computer system 102. The host computer system can provide a rating of the provided solution to the solution store 105. This rating can be used, as described above, to generate or change a rating of a particular solution.

Figure 3:
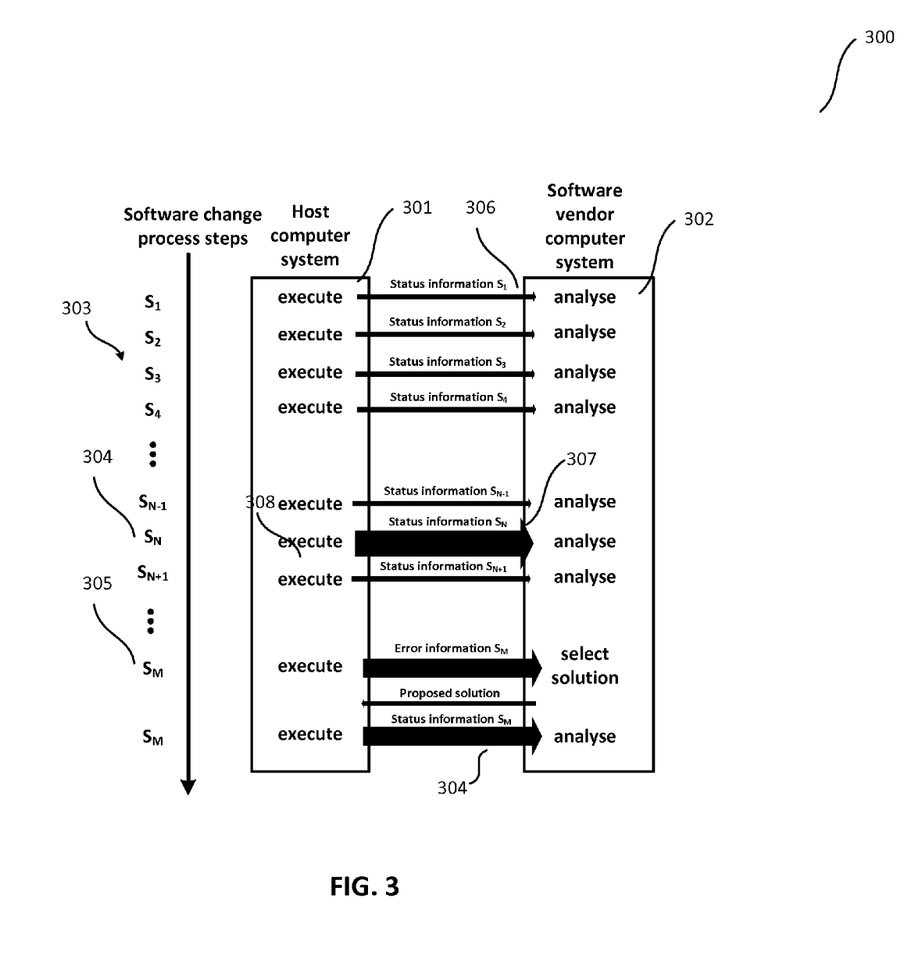
FIG. 3 illustrates an example of status information transmission between a host computer system and a software vendor computer system according to an implementation.

FIG. 3 illustrates an example status information transmission scheme in a software change process instance. The example software change process of FIG. 3 has a number of steps 303, 304, 305 which, in some implementations, have to be executed on a host computer system 302 in a serial manner. A first group of software change process steps 303 are executed on the host computer system without errors. During or after completion of each step, the host computer system 301 pushes status information 306 towards the software vendor computer system 302. At the software vendor computer system 302, the status information is analyzed (e.g., as described in the present disclosure).

After several steps of the software change process have been executed, the process arrives at a second set of steps 304 including a step ($S_N$) which has been identified as a hot spot by the software vendor computer system 302. As indicated by the thick arrow in FIG. 3, status information is pushed to the software vendor computer system 302 from the host computer with an increased level of detail for this step. In some examples, this can include that the status information is pushed more frequently than for the other steps. In addition to or alternatively, the amount of status information can be increased. In addition to or alternatively, additional types of status information can be pushed for a step identified as a hot spot.

In some examples, the level of detail of status information can be selected by a predetermined parameter. The predetermined parameter can determine a level of detail with which status information is pushed for a particular step of a software change process. For instance, a coarsest level of the log parameter can indicate that only an identifier of a step of a software change process and a success or failure message (e.g., potentially including an error ID) is pushed. If the log parameter is set to a higher level of detail, additional information can be added to the status information. For instance, current values of system parameters of a system the software change process acts upon can be added to the status information. In addition to or alternatively, log data of tasks to be performed in a particular step of the software change process can be added. In addition, a frequency of a push operation can be increased.

In a further example of selecting the level of detail of status information by a predetermined parameter the software change process includes a step which adjusts all database tables to the structure required for a new version of the software. If a predetermined parameter the software change process is set to a first ("coarsest") level (e.g., a logging level 0) a smallest amount of information is transmitted. This can include, e.g., that it is only logged that a step was successful, how long its execution took and how many objects have been processed. An increased level of detail could provide for every database table an entry stating the name of the table and the duration of the database statement execution. In a further increased level of detail database statement and the SQL return code of the database can be added. In an even higher level of detail, the software change process tool can state which software change process tool internal function or module has been called and which parameters have been passed to the module.

In one example, on a highest level of detail a trace of every action happening during a particular step of a software change process can be pushed to the software vendor computer system 302. The level of detail can also be set in other ways than by a single parameter. In some examples, the amount of data to be pushed at the highest level of detail can be several megabytes per second. In this example, only ramping up the level of detail for predetermined hot spots can substantially reduce network traffic and memory requirements of a monitoring process.

As can be seen in FIG. 3, no error occurs during step $S_N$ identified as a hot spot. Therefore, the software change process proceeds undisturbed after the step has been executed. Status information having an increased level of detail is provided to the software vendor computer system 302, where it can be processed employing the techniques described in the present disclosure.

In After having executed several other steps, the software change process arrives at a second set 305 ($S_M$) identified as a hot spot. Again, a level of detail for the status information pushed to the software vendor computer system 302 is increased. The level of detail can be the same for all steps identified as hot spots. However, in other examples, a level of detail can differ for different steps identified as hot spots. For instance, a level of detail can be specific to a particular step or a type of steps in a software change process.

As depicted in FIG. 3, an error occurs during execution of the second hot spot step 305 of the software change process. As a result, the status information includes an error identifier. In response to receiving the status information including the error identifier, the software vendor computer system 302 selects a suitable solution based on the received status information, the error identifier and received software change process parameters (not shown in FIG. 3). A user at the host computer system can use the information of the solution to resolve the problem. As shown in FIG. 3, a second execution of the hot spot step $S_M$ is successful. During execution of this step status information is again pushed with an increased level of detail.

Figure 1:
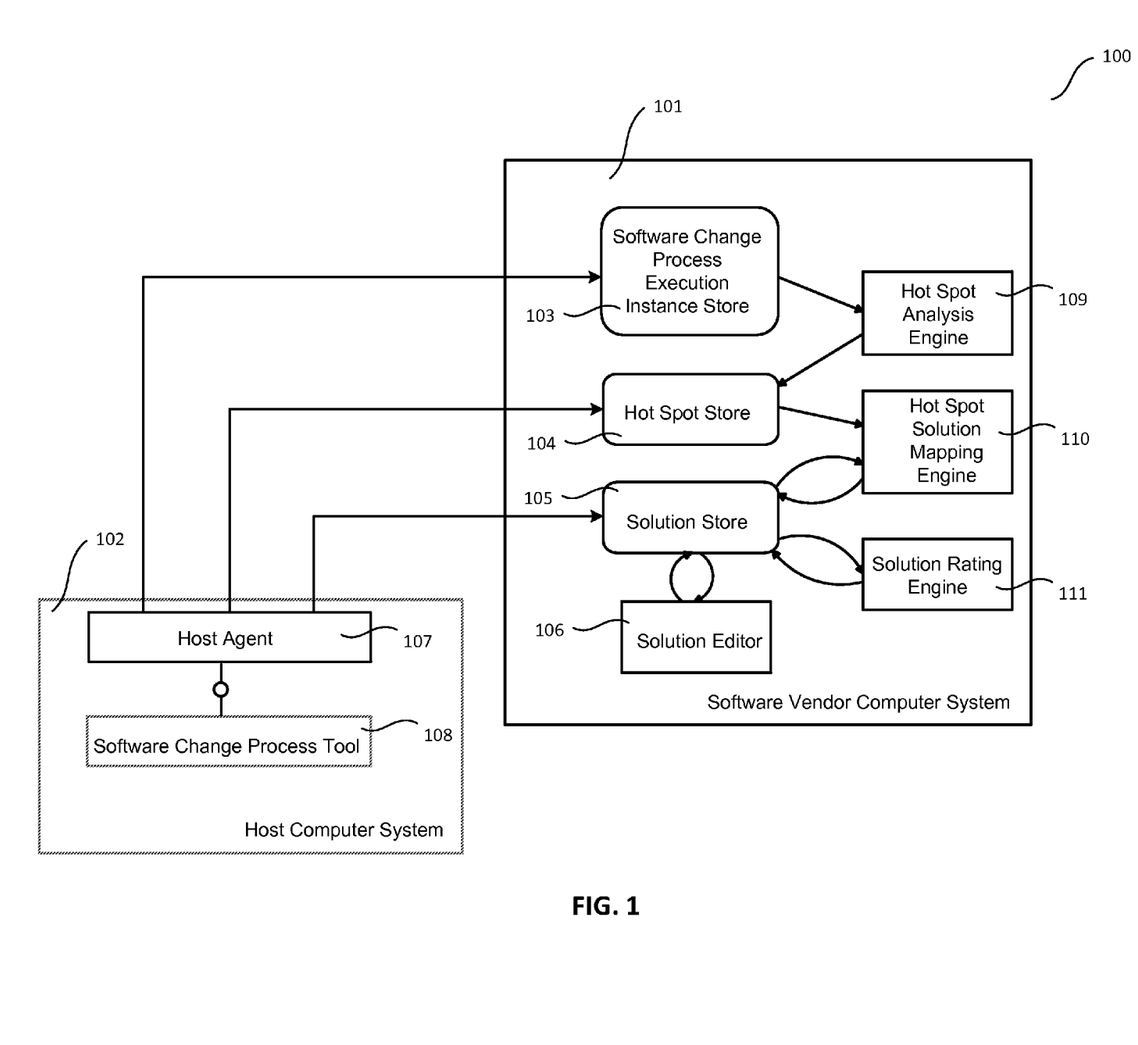
FIG. 1 illustrates a layout of an example system for optimizing a software change process according to an implementation.

Even though in FIG. 1 and FIG. 2 a single host computer system 102 has been discussed for the sake of illustration, the systems described herein (e.g., the software vendor computer system 101) can interface with a multitude of different host computer systems 102 running a particular software. For instance, a database system can be installed on a multitude of different computer systems. In this situation, multiple instances of one or more software change process tools can be executed in parallel at any given time. The software vendor computer system 101 can collect data from different host computer systems and process them as described in the present disclosure.

In one optional example, software change processes can run in parallel in relation to production systems. In these examples, the host computer system can not only push software change process parameters and status information, but also push information regarding an impact of the software change process on the production system. For instance, particular tables can be read-only during execution of particular steps of a software change process. It can be monitored as to how often the production system tries to write to these tables. In addition to or alternatively, it can be monitored which tables are used by the production system during the software change process. This information can be used in the software change process methods described in the present disclosure. For instance, this information can be used to identify hot spots of a software change process. In one example, a step of a software update process is identified as a hot spot if a production system accesses a particular table with a predetermined frequency and this table is processed in the particular step of the software change process such that a table update operation would fail. In other words, in these examples the scope of the error discussed in the preceding sections is extended to not only include errors of the software change process but also the production system. In the same manner, solutions offered by the solution store can also take into account these errors in the production system.

In one optional example, activities which are executed in the context of a problem solution can be collected by the software vendor computer system 101 (this can require that a user executing the software change process allows this operation). The collected information can include one or more of change operations executed in the operating system environment, change operations to the system, calls to tools, etc. In addition, the user can be automatically asked how they resolved a particular problem and whether any automated hints being provided helped to solve the problem. This information can then be used to create a new solution to be stored in the solution store 105. In subsequent operation, this solution can be provided to users, as described above.

In one optional example, a watch dog can be created after an error has been reported. The watch dog can monitor what happened in a time between the error and a time when the software change process continued. Activities of a user at the host computer system 102 can be analyzed. For example, it can be analyzed which patches have been downloaded to the host computer system 102, which notes have been read and which manual activities have been executed between error report and successful continuation. This information can also be used at the vendor computer system 102 to provide new or improved solutions to errors in software change processes.

In the preceding sections it has been described how the host computer system 102 communicates with the software vendor system 101 and pushes software process parameters and status information relating to a particular software change process. In some examples, the host computer system can be equipped with protective measures against harmful network communication with external systems (e.g., a firewall). In this situation, it can be difficult to push the software process parameters and status information to the software vendor computer system 101. In this situation a user can access the host computer system using a remote terminal hosted on an external computer device. The software process parameters and status information can be received from the host computer system using the remote terminal and pushed towards the software vendor computer system 101 by another functional unit of the external computer device.

Figure 4:
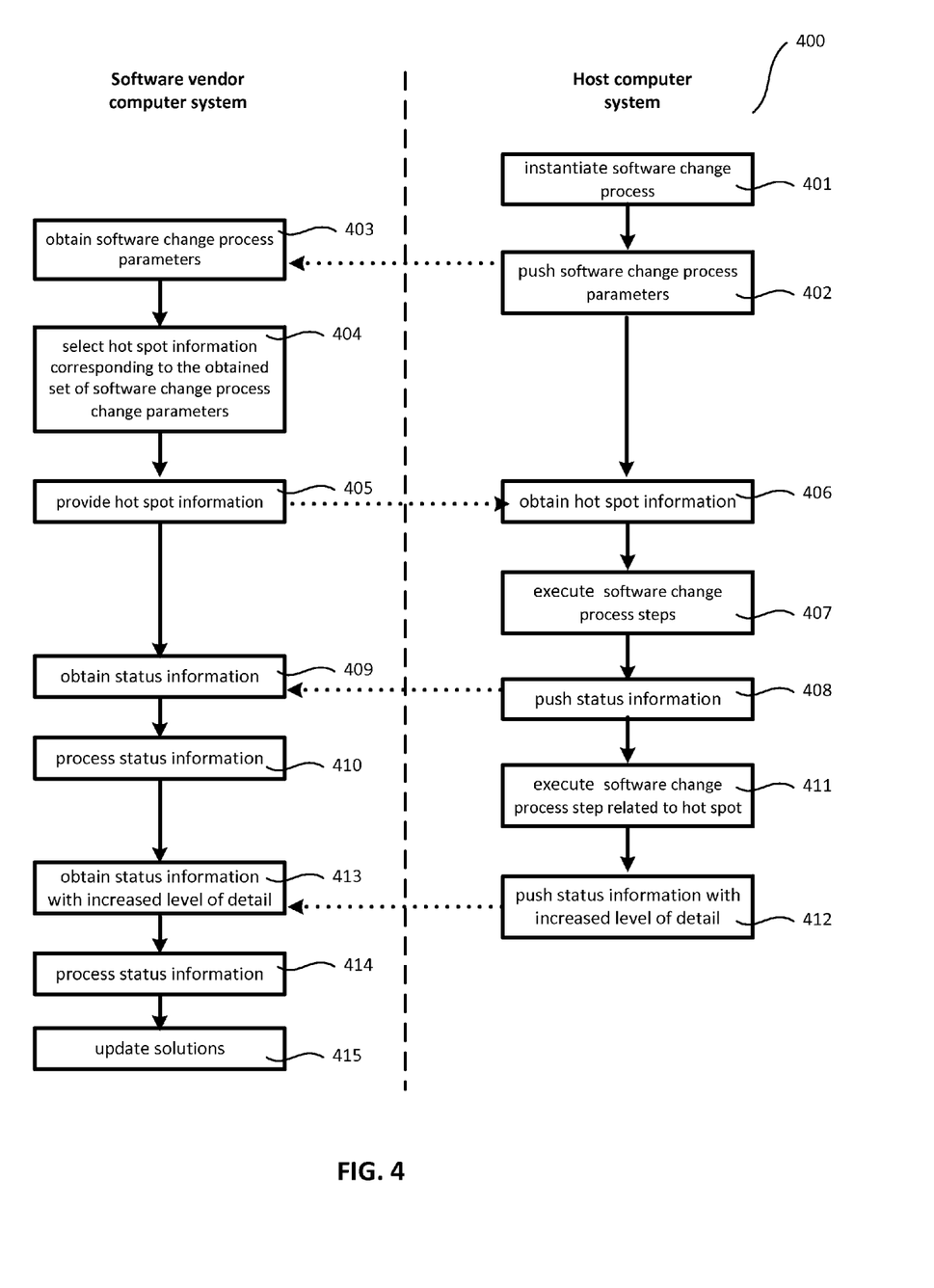
FIG. 4 illustrates an example method for optimizing a software change process according to an implementation.

In FIG. 4, another example software change process 400 according to the present disclosure is illustrated. In open operation 401, a software change process is initiated at a host computer system. From 401, software change process 400 proceeds to 402. In a further operation 402, a set of software change process parameters is pushed to a software vendor computer system. From 402, software change process 400 proceeds to 403. The set of software change process parameters is obtained, in a further operation 403, at the software vendor computer system and the software vendor computer system selects 404 hot spot information corresponding to the obtained set of software change process change parameters. The selected hot spot information is provided 405 to the host computer system, where it is obtained in a further step 406. The steps of the software change process are executed 407 on the host computer system. During each of the steps, in a further operation 408, the host computer system pushes status information to the software vendor computer system. At the software vendor computer system, this status information is obtained 409 and processed 410. At operation 411, the software change process reaches a step identified as a hot spot in the hot spot information. The host computer system pushes 412 status information for this step with an increased level of detail. The status information with an increased level of detail is obtained 413 and processed 414 by the software vendor computer system. In response to the status information for the hot spot step, the software vendor computer system can update 415 solutions in a solution store of the software vendor computer system.

In the previous sections, the components of the system for optimizing a software change process have been described as functional units. These functional units can be embodied in different hardware and software environments, as will be discussed in the subsequent sections.

At a high level, the software change process optimization method is associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations (e.g., in a manner that the operations are distributed among the two or more processors). The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, a computer or processor may be a desktop or a laptop computer, a cellular phone, a smartphone, a personal digital assistant, a tablet computer, an e-book reader or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device," "server," or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases and thereby exploit recent innovations in hardware to run a database in main memory. In an implementation of the present disclosure described herein, the servers may be types of a Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two different of the above mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others. E.g. SAP ABAP, Java Script, SQL script The figures and accompanying description illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons," some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome or Firefox. "Creating an icon" is to be understood as generating a new icon on the user interface. "Modifying an icon" is to be understood as changing a property of an existing icon on the user interface. "Deleting an icon" is to be understood as vanishing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Implementations of the subject-matter described in this specification can be implemented in a computing system that includes a back end component, e.g., as a server, or that includes a middleware component, e.g., an application server, or that includes a front end component, e.g., a user computer having a graphical user interface or a Web browser through which a user can interact with an implementation of the subject-matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer implemented method, comprising:
   obtaining, from a host computer system on which a software change process is to be executed, a set of software change process parameters characterizing the particular software change process, wherein the software change process includes multiple steps to be carried out to effect the software change;
   based on the obtained set of software change process parameters, selecting hot spot information corresponding to the obtained set of software change process parameters, wherein the hot spot information is based on a statistical analysis of previous software change processes and wherein the hot spot information identifies one or more steps of the multiple steps of the software change process during which problems have occurred in the previous software change processes;
   providing the hot spot information to the host computer system for use in the software change process; and
   obtaining, from the host computer system, status information relating to the software change process at multiple times during the execution of the software change process, wherein a level of detail of the status information is increased for steps of the software change process identified in the hot spot information.

2. The computer implemented method of claim 1, wherein the steps are executed on a computer system of a vendor of software the software change process acts upon.

3. The computer implemented method of claim 2, wherein the operations of obtaining a set of software change process parameters, selecting the hot spot information, providing the hot spot information to the host computer system and obtaining the status information are executed on the computer system of a vendor of software automatically.

4. The computer implemented method of claim 1, wherein set of software change process parameters includes one or more of an identifier of a software change process tool which is employed in the software change process, versioning information of a software change process tool which is employed in the software change process, system parameters of the computer system the software change process acts upon, information regarding the steps of the software change process is to be executed and information regarding the content to be deployed on the computer system the software change process acts upon.

5. The computer implemented method of claim 1, wherein the status information comprises information regarding one or more of a duration of the execution of a particular step of the software change process, a success or failure of the execution of a particular step of the software change process, a duration of the execution of the entire software change process and a success or failure of the execution of a entire step of the software change process.

6. The computer implemented method of claim 5, further comprising:
   analyzing obtained sets of software change process parameters and obtained status information of one or more software change processes;
   identifying critical software change processes or critical steps of particular software change processes based on the analyzing operation; and
   indicating the identified critical software change processes or critical steps of particular software change processes in the hot spot information.

7. The computer implemented method of claim 6, wherein the operations of analyzing obtained sets of software change process parameters and obtained status information, identifying critical software change processes or critical steps of particular software change processes and indicating the identified critical software change processes or critical steps of particular software change processes are executed automatically.

8. The computer implemented method of claim 6, wherein identifying critical software change processes or critical steps of particular software change processes includes one or more of determining a deviation from an average duration and/or success rate for a particular software change process having a particular set of software change process parameters or of a step of a particular software change process having a particular set of software change process parameters from other software change processes or steps of software change processes.

9. The computer implemented method of claim 1, further comprising:
   obtaining, from the host computer system during execution of the software change process, status information indicating that an error occurred during execution of a particular step of the software change process;
   automatically identifying a possible solution from a set of solutions based on the obtained status information, the set of software change process parameters of the software change process, or both; and
   automatically providing the identified possible solution to the host computer system.

10. The computer implemented method of claim 9,
    wherein each solution is associated with a set of software change process parameters, obtained status information, or both, of one or more previous software change processes or steps of previous software change process where the solution was successfully applied, and
    wherein the possible solution is automatically selected from a set of solutions based on a similarity of the status information, the set of software change process parameters of the software change process, or both of the and status information, set of software change process parameters, or both of previous software change processes associated with the solution.

11. The computer implemented method of claim 10, wherein automatically selecting the solution comprises determining if a solution exists having identical status information, an identical set of software change process parameters of the software change process, or both,
    if no such solution exists, determining if a solution exists having similar status information, a similar set of software change process parameters of the software change process, or both.

12. The computer implemented method of claim 1, wherein an increased level of detail of status information includes one or more of an increased frequency with which status information is sent, an increased amount of data which is provided as status information and additional information regarding the software change process, the host computer system on which a software change process is executed, information regarding the actions of a technician carrying out the software change process and a trace of the operations executed at the host computer system.

13. The computer implemented method of claim 1, wherein the operations are executed in an in-memory database environment.

14. The computer implemented method of claim 1, further comprising:
    automatically collecting, from the host computer system, information regarding activities in connection with a problem solution of an error which has occurred during the software change process; and
    including a new solution in a store of possible solution based on the collected information.

15. The computer implemented method of claim 1, wherein the software change process is executed during run time of the software to be changed, the method further comprising:
    obtaining, from the host computer system, information regarding an impact of the software change process on the run time performance of the software to be changed; and
    adapting a software change process based on the information regarding an impact of the software change process on the run time performance of the software.

16. The computer implemented method of claim 10, wherein automatically selecting the solution comprises determining if a solution exists having identical status information, an identical set of software change The computer implemented method of claim 1, wherein the status information is pushed from the host computer system on which a software change process is to be executed.

17. The method of claim 1, further comprising:
    automatically analyzing status information associated with multiple software change processes;
    determining whether for a particular step of a particular software change process a problem frequency is above a predetermined threshold; and
    identifying the particular step as hot spot if the problem frequency is above the predetermined threshold.

18. A computer implemented method, comprising:
    providing a set of software change process parameters characterizing the particular software change process to be executed on a host computer to a remote computer system, wherein the software change process includes multiple steps to be carried out to complete the software change;
    obtaining, from the remote computer system, hot spot information corresponding to the provided set of software change process parameters, wherein the hot spot information is based on a statistical analysis of previous software change processes and wherein the hot spot information identifies one or more steps of the multiple steps of the software change process during which issues have occurred in the previous software change processes;
    providing status information relating to the execution of the software change process to the remote computer system at multiple times during the execution of the software change process, wherein a level of detail of the status information is increased for steps of the software change process identified in the hot spot information than for other steps of the software change process.

19. A non-transitory, computer readable medium storing instructions thereon which when executed by a processor cause the processor to:
    obtain, from a host computer system on which a software change process is to be executed, a set of software change process parameters characterizing the particular software change process, wherein the software change process includes multiple steps to be carried out to effect the software change;
    based on the obtained set of software change process parameters, select hot spot information corresponding to the obtained set of software change process parameters, wherein the hot spot information is based on a statistical analysis of previous software change processes and wherein the hot spot information identifies one or more steps of the multiple steps of the software change process during which problems have occurred in the previous software change processes;
    provide the hot spot information to the host computer system for use in the software change process; and
    obtain, from the host computer system, status information relating to the software change process at multiple times during the execution of the software change process, wherein a level of detail of the status information is increased for steps of the software change process identified in the hot spot information.

20. A computer system comprising:
one or more processors; and
a non-transitory, computer-readable medium storing instructions executable by the one or more processors to perform operations comprising:
    obtaining, from a host computer system on which a software change process is to be executed, a set of software change process parameters characterizing the particular software change process, wherein the software change process includes multiple steps to be carried out to effect the software change;
    based on the obtained set of software change process parameters, selecting hot spot information corresponding to the obtained set of software change process parameters, wherein the hot spot information is based on a statistical analysis of previous software change processes and wherein the hot spot information identifies one or more steps of the multiple steps of the software change process during which problems have occurred in the previous software change processes;
    providing the hot spot information to the host computer system for use in the software change process; and
    obtaining, from the host computer system, status information relating to the software change process at multiple times during the execution of the software change process, wherein a level of detail of the status information is increased for steps of the software change process identified in the hot spot information.

\* \* \* \* \*